United States Patent
Trelstad et al.

(10) Patent No.: US 6,651,416 B2
(45) Date of Patent: Nov. 25, 2003

(54) LARGE RECTANGULAR BALER HAVING HYDRAULICALLY POWERED FUNCTIONS, AND CONTROL SYSTEM THEREFOR

(75) Inventors: Timothy John Trelstad, Ottumwa, IA (US); Paul David Parker, Ottumwa, IA (US); Darin Ledru Roth, Ottumwa, IA (US); Kerry Stephen Martin, Springfield, IL (US); Donald Wayne Demorest, Ottumwa, IA (US); Eric Ryan Lang, Donnellson, IA (US); David Vincent Rotole, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/084,906

(22) Filed: Feb. 28, 2002

(65) Prior Publication Data

US 2003/0159421 A1 Aug. 28, 2003

(51) Int. Cl.[7] ............................................... A01D 39/00
(52) U.S. Cl. ...................................... 56/341; 56/10.2 R
(58) Field of Search ............................. 56/341, 10.2 R, 56/10.2 A, 10.2 G, 10.2 H; 100/45, 48, 88; 460/1, 6

(56) References Cited

U.S. PATENT DOCUMENTS

| | | | |
|---|---|---|---|
| 4,627,341 A | 12/1986 | Sudbrack et al. | 100/41 |
| 5,253,570 A | 10/1993 | Goeckner | 100/41 |
| 5,551,218 A * | 9/1996 | Henderson et al. | 53/504 |
| 5,855,166 A | 1/1999 | McPherson | 100/3 |
| 5,894,718 A | 4/1999 | Hawlas et al. | 56/341 |
| 6,073,426 A | 6/2000 | Mesmer et al. | 56/10.2 R |
| 6,161,368 A | 12/2000 | Wilkens et al. | 56/341 |
| 6,390,915 B2 * | 5/2002 | Brantley et al. | 460/131 |

* cited by examiner

Primary Examiner—Thomas B. Will
Assistant Examiner—Meredith Petravick (57) ABSTRACT

A large rectangular baler includes pick-up and packer rotors, a pivotable stuffer, a plunger head, a knotter shaft and a needle yoke, and tension panels that are all driven hydraulically and independently controlled through electrically controlled valves that actuate the various hydraulic power devices used to power the various functions. An electronic control unit is coupled to each of the control valves and receives feedback signals from the controlled functions which are compared with values representing desired function results so as to further control the valves to attain the desired results. In addition to the feedback signals from the powered functions, signals from a bale length sensor and a ground speed sensor are also coupled to the electronic control unit for use in controlling the powered functions.

9 Claims, 6 Drawing Sheets

LARGE RECTANGULAR BALER HAVING HYDRAULICALLY POWERED FUNCTIONS, AND CONTROL SYSTEM THEREFOR

FIELD OF THE INVENTION

The present invention relates to a large rectangular baler and, more specifically, relates to a drive and control system for such a baler.

BACKGROUND OF THE INVENTION

The power systems for large rectangular balers typically include mechanical drives including gear transmissions and shafts for transferring power from a power take-off of a tractor to drive the various functions of the baler such as the pick-up, pre-charge chamber packer, charge stuffer, plunger, needles and knotters. The speeds at which those of these functions that deal with the delivery of crop to the baling chamber are driven, with respect to each other, is pre-selected and designed into the baler by the selection of the gearing. This has the drawback that there is no way to easily adapt the operation of the baler to different crops or changing crop conditions as is desired for more efficient operation. For example, it might be desired to operate the pick-up and/or packer at a slower or faster speed, depending on whether the crop windrow is light or heavy or the crop itself is relatively dry and brittle or somewhat damp and tough, or depending upon the speed at which the baler is towed. This ability has the benefit of being able to handle the crop in a gentler manner which is especially helpful in reducing leaf loss when baling alfalfa, for example, and to reduce the possibilities of plugging the baler.

U.S. Pat. Nos. 6,161,368; 6,073,426 and 5,894,718 disclose various large rectangular baler control systems for mechanically driven balers which address crop feeding concerns, with the '718 patent disclosing an embodiment including a planetary transmission with which an electric or hydraulic motor is associated so as to be able to change the drive speed and/or direction, however, this speed and/or direction change affects the entire drive system, which may not be desirable.

SUMMARY OF THE INVENTION

According to the present invention there is provided an improved control system for a large rectangular baler.

An object of the invention is to provide a large rectangular baler control system including various drives constructed for being driven and controlled independently of one another for achieving operational efficiency of the baler.

A more specific object of the invention is to provide a large rectangular control system wherein the speed of the pick-up and/or packer arrangements can be varied at will without affecting the speed of operation of any other driven function.

Yet another object of the invention is to provide a large rectangular baler having independently controlled, hydraulic drive components for supplying power to all powered functions of the baler.

A more specific object of the invention is to use an electronic control unit capable of storing desired function values and for receiving feedback signals from controlled functions so that signals for operating control valves of the various hydraulic functions may continuously take into account the feedback signals for achieving the desired function value.

These and other objects of the invention will become apparent from a reading of the ensuing description together with the appended drawings.

DESCRIPTION OF THE PREFERRED EMBODIMENT

Figure 1:
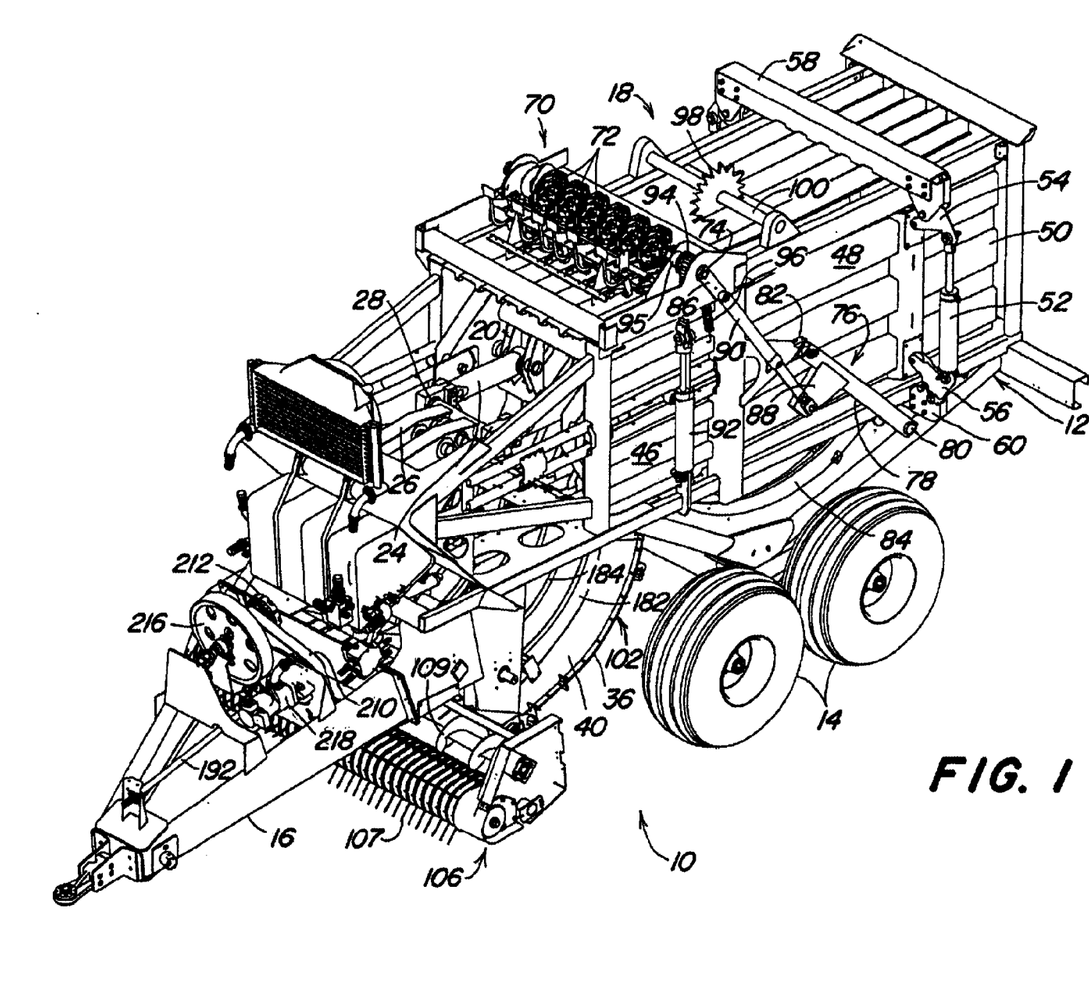
FIG. 1 is a somewhat schematic, left front perspective view of a large rectangular baler embodying the control system of the present invention.
Figure 2:
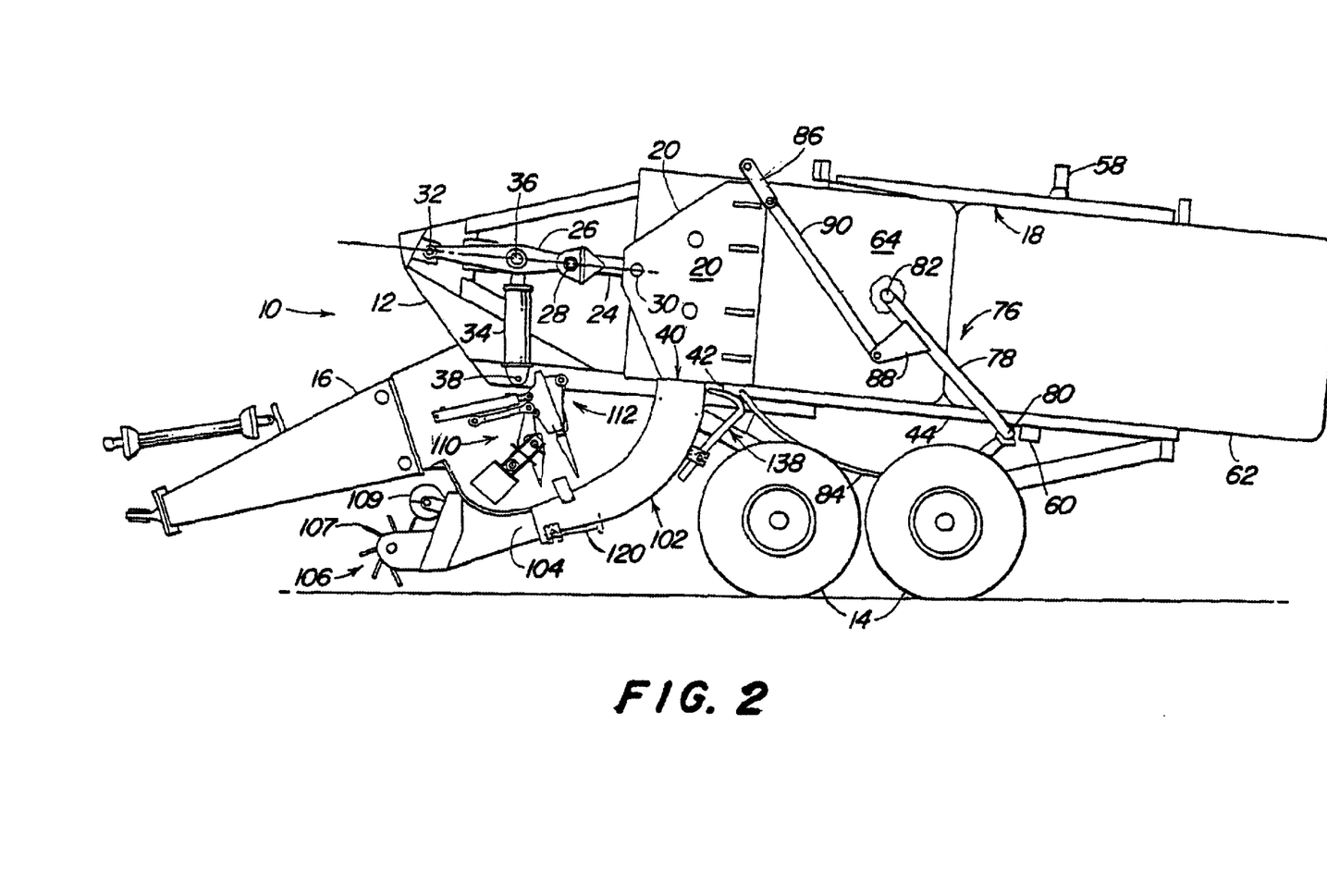
FIG. 2 is a schematic, left side elevational view of the baler shown in FIG. 1, with the left side of the baling chamber being removed to reveal the relationship of the plunger head to the inlet located in the bottom of the baling chamber.

Referring now to FIGS. 1 and 2, there is shown a large rectangular baler 10 including a main frame 12 supported on right- and left-hand sets of tandem wheels 14 for being towed over the ground by a tractor coupled to a forward end of a draft tongue 16, which is fixed to a forward end of the frame 12. A longitudinally extending baling chamber 18, of rectangular or square cross-section, is supported centrally on the frame 12 at an elevation above the sets of wheels 14.

A plunger head 20 is mounted in a forward section of the chamber 18 for being reciprocated through the action of a toggle linkage defined by a pair of transversely spaced first links 24 and a second link or crank arm 26. The links 24 and 26 are pivotally coupled to each other at a pivotal connection 28, with the pair of first links 24 being pivotally coupled to the plunger head 20 at respective pins 30, and with the second link 26 being coupled to the frame 12, as at a pin 32. A hydraulic plunger head drive cylinder 34 is provided for toggling the links 24 and 26, and for this purpose has a rod end coupled, as at a pin 36 to a location of the link 26 that is between the pivotal connections 32 and 28, and has a rod end coupled to the frame 12, as at pivot pin 38. When the drive cylinder 34 is fully retracted, as shown in FIG. 2, the plunger head 20 is fully extended to the rear, with the pins 30 and 32 being located such that they lie along a longitudinal central axis of the baling chamber 18. Extension of the cylinder 34 will cause the link 26 to be pivoted upwardly about the pin 32 resulting in the plunger head 20 being retracted to the extent that it uncovers a crop material inlet 40 extending entirely across a region located just in front of a stationary knife (not shown) provided across a forward end 42 of a bottom wall or floor 44 of the baling chamber 18.

The baling chamber 18 includes a front section 46 of fixed cross section which is joined to a rear section 48, of variable cross section, having opposite side panels 50 which are respectively mounted for swinging horizontally about vertical hinges (not shown) provided at their forward ends. Located at opposite sides of the baling chamber 18 are a pair of tension control cylinders 52, each being coupled between upper and lower bell cranks 54 and 56, respectively, having first legs respectively pivotally anchored to respective outer ends of upper and lower, transverse support members 58 and 60, and having respective second legs pivotally coupled to the side panels 50. Contraction of the cylinders 52 causes the side panels 50 to pivot towards each other to decrease the cross sectional area of the rear baling chamber section 48, and thus, further restrict rearward movement of a formed bale 62 so as to increase the density of a forming bale 64, and with extension of the cylinders 52 causing the side panels to pivot away from each other to increase the cross section of the chamber section 48 so as to cause the density of the forming bale 64 to decrease.

A twine tying arrangement 70 (omitted from FIG. 2) is provided for wrapping and tying multiple loops of twine about the completed bale 62 and includes a plurality of knotter drive gears 72, here shown as being six in number, mounted at transversely spaced locations on a knotter shaft 74 that is rotatably mounted to the top of the baling chamber 18. A needle yoke arrangement 76, including opposite arms 78 joined by a cross tube 80, is mounted for vertical pivotal movement about a horizontal transverse axis defined by pivotal connections 82 that connect respective ends of the arms 78 to opposite side locations of rear regions of the fixed front baling chamber section 46. A plurality of curved, twine delivery needles 84, equal in number to the knotter drive gears 72, are respectively fixed to transversely spaced locations of the cross tube 80. A crank arm 86 is provided at each of opposite ends of the knotter shaft 74, and pivotally connected between each crank arm 86 and a plate 88 fixed to each needle yoke arm 78, at a location close to the pivotal connection 82, is a connecting rod 90.

The knotter drive gears 72 and the needle yoke assembly 76 are both operated through the action of an extensible and retractable hydraulic knotter drive cylinder 92 (omitted from FIG. 2) connected between the frame 12 and one end of a length of roller chain 94, that engages teeth of a sprocket (not visible) forming part of a one-way clutch 95 mounted to the shaft 74, the other end of the chain 94 being fixed to one end of a coil extension spring 96 having its other end fixed to the frame 12. The chain 94 drives the sprocket when the hydraulic cylinder 92 is retracted, this rotation being transferred to the shaft 74 by the one-way clutch 95 coupled between the sprocket and the shaft 74. The rotation of the shaft 74 results in the needle yoke assembly 76 being swung vertically to deliver twine to knotters (not shown) coupled for being driven by the knotter drive gears 72 of the twine tying assembly 70, the knotters each operating to tie a second knot to complete a twine loop about the bale just being completed, and to tie a first knot between twine ends of two strands of twine for being looped about the new bale being formed, all in one cycle of the needles. The one-way clutch 95 operates for permitting the extension spring 96 to unload and reset the hydraulic cylinder 92 for the next tying cycle without causing reverse rotation of the shaft 74 which already has the knotter gears 72 in position for the next tying cycle.

The bale tying cycle is initiated by a bale length sensor arrangement including a toothed metering wheel 98 (omitted from FIG. 2) mounted on a shaft 100 extending horizontally across and being rotatably mounted to the top of the baling chamber 18. The metering wheel 98 has a toothed periphery which extends into the baling chamber 18 and is contacted by a forming bale so as to be rotated as the bale grows in length. In a manner explained more fully below, the rotation of the metering wheel is sensed and converted into a signal representing bale length, with a control signal being sent to initiate the tying cycle when the forming bale reaches a length corresponding to a desired bale length.

Figure 3:
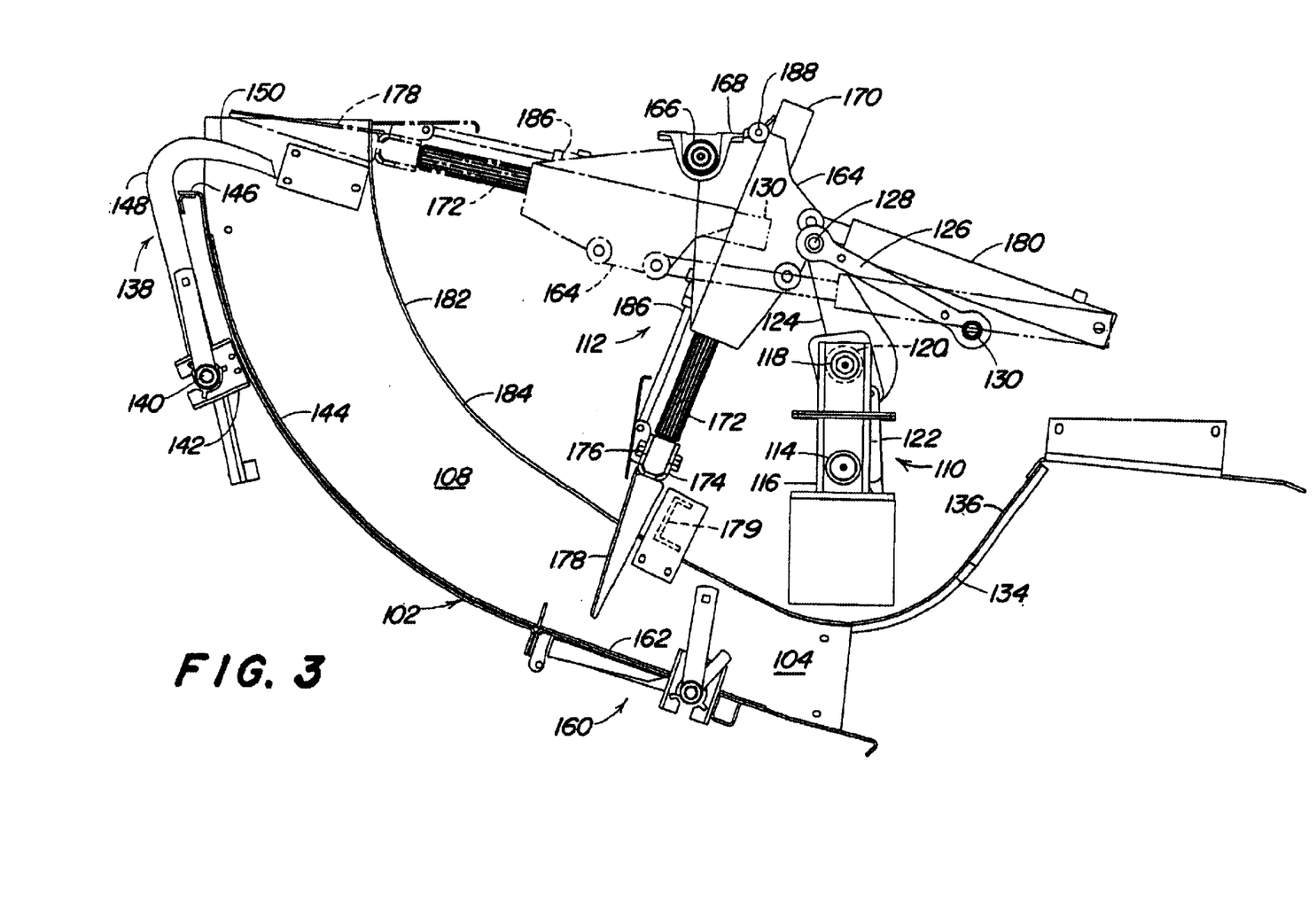
FIG. 3 is a right side elevational view of the feed duct, with parts in section, showing the pre-charge chamber and the packer and stuffer arrangements associated with it.

Referring now also to FIG. 3, there is shown a feed duct or chute 102 having an open forward end section 104, disposed for receiving crop from a pick-up arrangement 106, and being curved upwardly and rearwardly from the forward end section to a near vertical rear end located for delivering crop through the baling chamber inlet 40. The pick-up arrangement 106 includes a rotary tine pick-up 107, including a drive rotor or shaft, and a pair of stub augers 109 following the pick-up 107 for centering crop to the width of the baling chamber 18. The duct 102 defines a pre-charge chamber 108 into which crop material delivered by the pick-up arrangement 106 is fed by a packer fork arrangement 110. Upon the material being compressed to a pre-selected density within the pre-charge chamber 108, a stuffer arrangement 112 engages a pre-compressed charge of crop material, sometimes called a flake or slice, and sweeps it from the pre-charge chamber 108 and into the baling chamber 18, by way of the baling chamber inlet 40.

The packer fork arrangement 110 includes a crank shaft 114 having opposite ends mounted for rotation in frame supports 116 and including a radially offset crank section 118 having a fork tine mounting tube 120 mounted to it for oscillating thereabout. Fixed at spaced locations along the tube 120 are a plurality of wedge-shaped packer tines 122. Fixed to opposite ends of the tube 120 and projecting in a direction opposite from the tines 122 are arms 124 having their radially outer ends respectively coupled to first ends of a pair of guide or radius links 126 by pins 128, with second ends of the radius links 126 being respectively pivotally anchored to the frame 12 by pivot pins 130. A reversible hydraulic motor 132, shown only in FIG. 5b, is coupled for driving the shaft 114 in the clockwise direction, as considered in FIG. 3, during normal baling operation so that the packer tines 122 are caused to reach through respective slots 134, provided in an upwardly and forwardly flared, upper forward wall section 136 of the duct 102, and sweep crop material rearwardly into the open forward end section 104 of the duct 102.

Provided for retaining crop material in the duct 102 until it has reached a predetermined degree of pre-compression, i.e., a predetermined density, is a retaining fork arrangement 138 including a horizontal, transverse shaft 140 having opposite ends rotatably mounted in a pair of brackets 142 fixed to a bottom wall 144 of the duct at a location spaced downwardly from a lip 146 extending the width of, and defining a rear end of, the bottom wall 144. The fork arrangement 138 further includes a plurality of transversely spaced, hook-shaped retainer tines 148 fixed at transversely spaced locations along the shaft 140 and having upper, forwardly extending ends 150 located at a height greater than that of the duct lip 146. The retainer tines 148 are pivoted with the shaft 140 between a retaining position, as shown, wherein the tine ends 150 extend over the lip 146 and into the end of the duct 102 so as to define an upper end of the pre-charge chamber 108, and a release position (not shown), wherein the tine ends 150 are withdrawn from the duct 102 so as to permit the free discharge of the pre-compressed charge of crop material out of the duct 102 and through the baling chamber inlet 40. A crank arm 152, shown only in FIG. 5b, is coupled to the shaft 140, and coupled between the crank arm 152 and the frame 12 for selectively moving the tines 148 between their retaining and release positions is an extensible and retractable hydraulic tine cylinder 154, also shown only in FIG. 5b.

The retaining fork arrangement 138 operates in conjunction with a density sensor 160 including a hinged, spring-loaded, rectangular door 162 provided in, and extending across the width of, the bottom wall 144 of the duct 102 adjacent a forward end thereof in a location downstream from the area swept by the packer fork tines 122 of the packer assembly 110. The tine ends 150 of the retaining fork arrangement 138 remain in their retaining position until the pressure of the compressed crop deflects the door 162 to an extent which corresponds to a condition when the precompressed charge of crop material reaches a pre-selected density. The density sensor 160 then sends a signal, in a manner described below, which actuates the tine cylinder 154 of the retaining fork arrangement 138 so that it is caused to be moved from its retaining position to its release position. The plunger head cylinder 34 is then in an extended condition wherein the plunger head 20 is retracted to a location forward of the baling chamber inlet 40. The stuffer arrangement 112 is then operated to move the precompressed charge of crop material into the baling chamber 18.

Specifically, the stuffer arrangement 112 includes a frame 164 located centrally above the duct 102 and fixed to a transverse pivot shaft 166 that is mounted for rotation in bearing holders 168 that are fixed to the frame 12 at transversely spaced locations, substantially vertically above the density sensor 160. A guide tube 170 is fixed to the frame 164 and is oriented so as to be angled slightly rearward of vertical from top to bottom when the frame 164 is in an extreme forward position, as shown. For a purpose explained below, the interior of the guide tube 170 is splined, and mounted for reciprocation in the guide tube 170 is a support bar 172 having complementary splines formed thereabout along its length. A lower end of the support bar 172 is received between opposite legs of a transversely extending tine support 174, that is in the form of a U-shaped channel, and is secured therein by spaced bolts 176 received in respective aligned sets of holes provided in the support bar 172 and the legs of the tine support 174. Fixed, as by welding, at transversely spaced locations along the length of the web of the tine support 174 are a plurality of stuffer tines 178 that are wedge-shaped in profile and are arranged so that they taper to a point in a direction away from the tine support 174.

A cross support 179, which is generally C-shaped in cross section, is fixed to, and forms a joint between, a forward end of a rear upper wall section 182 of the duct 102, that extends from the support 179 to the rear end of the duct 102, and the rear end of the flared, upper forward wall section 136 of the duct 102. The cross support 179 is located opposite from the door 162 in the lower duct wall 144, and extending rearwardly in the upper rear wall section 182, from a location adjacent the cross support 179, are a plurality of transversely spaced, longitudinally extending slots 184 that are aligned with the stuffer tines 178 so as to permit them to extend into and sweep along the duct 102. The splined coupling between the tube 170 and the support bar 172 keeps the support 174 oriented such that the tines 178 are maintained in alignment with the slots 184.

An extensible and retractable hydraulic tine injector cylinder 186 is coupled between a pivot coupling 188, carried by the frame 164, and the stuffer tine support 174, the cylinder 186 being retracted, with the tines 178 withdrawn from the pre-charge chamber 108, when the stuffer arrangement 112 is in a forward, home or standby condition. Upon the crop material reaching the desired density within the chamber 108, the cylinder 186 is caused to extend to move the tines 178 through the slots 184 and into the pre-charge chamber 108, as shown in solid lines in FIG. 2, so as to engage the pre-compressed charge of crop material located there. An extensible and retractable stuffer or lift cylinder 180 is coupled between the main frame 12 and a central front location of the stuffer assembly frame 164. The cylinder 180 is in a retracted condition, as shown in solid lines in FIG. 3, when the stuffer arrangement 112 is in its forward home or standby position. When the tine ends 150 of the retaining arrangement 138 are withdrawn from the end of the precharge chamber 108 and the injector cylinder 172 has been extended to place the tines 178 into the chamber 108, the lift cylinder 180 is extended to cause the frame 164 to be rotated clockwise about the pivotal mounting 166, as viewed in FIG. 3, so as to cause the tines 178 to be lifted and, thus, swept rearwardly through the pre-charge chamber 108 to eject the crop material located therein through the baling chamber inlet 40. It is to be noted that the lower and upper rear wall sections 144 and 182 of the duct 102 are each located approximately at respective radius about the pivot shaft 166 so that the cross sectional dimension of the pre-charge chamber 108 remains approximately constant over the distance swept by the stuffer tines 178. Once the lift cylinder 180 has completed its extension stroke, the injector cylinder 186 will be retracted to withdraw the tines 178 from the pre-charge chamber 108, and then the lift cylinder 180 will be retracted to return the stuffer arrangement 112 to its initial, forward standby position.

Figure 4:
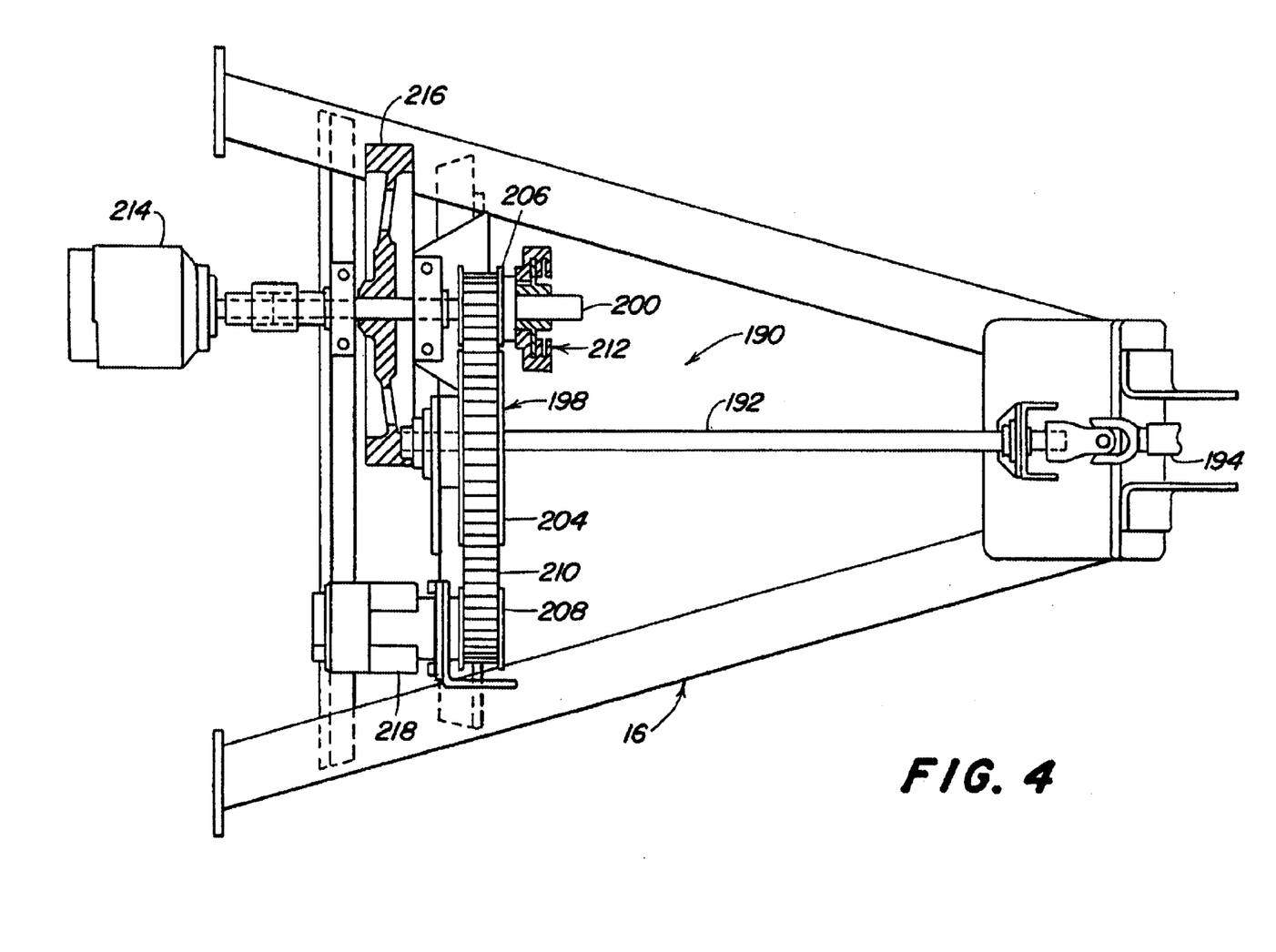
FIG. 4 is a schematic top plan view of the forward end of the baler showing the drive arrangement for the separate hydraulic pumps for supplying pressure fluid for driving the plunger head and auxiliary functions.

Referring now also to FIG. 4, there is shown a power supply arrangement 190 for providing a supply of pressurized fluid for operating the various functions of the baler 10. Specifically, a main power input shaft 192 is supported by longitudinally spaced bearings located in supports projecting upwardly from central locations of the tongue 16 such that the shaft 192 is located in a longitudinal center plane of the baler 10. The forward end of the shaft 192 is coupled to the rear end of a telescopic drive shaft 194, having a forward end adapted for being coupled to a power take-off shaft of a tractor 196, schematically shown in FIG. 5a, the engine of which serves as the source of power for the baler 10. A power-splitting transmission 198 is coupled for transferring power from the main shaft 192 to a plunger pump drive shaft 2 and to an auxiliary function pump drive shaft 202, visible only in FIG. 5a. The transmission 198 includes a first belt pulley 204, mounted for rotation with the main shaft 192, a second belt pulley 206 mounted for rotation about the shaft 2 and a third pulley 208 fixed for rotation with the auxiliary function pump drive shaft 202. A belt 210 is trained about the pulleys 204, 206 and 208. The second pulley 206 is joined to an outer section of a combined friction and one-way clutch 212 having its inner section fixed for rotation with the shaft 2. A reversible, variable displacement, plunger drive pump 214 is coupled to a rear end of the shaft 2, and fixed to the shaft 2 at a location between the clutch 212 and the pump 214 is a flywheel 216 (omitted from FIG. 5a). A variable displacement, auxiliary function drive pump 218 is coupled to the rear end of the shaft 202.

Accordingly, when the tractor power take-off is engaged, the main shaft 192 is driven and power is transferred from it to the shafts 2 and 202 by operation of the belt transmission 198. Slippage may initially occur between the friction elements of the clutch 212 carried by the pulley 206 and those carried by the shaft 2 until the speed comes up to that determined by the main drive or power shaft 192. The plunger drive pump 214 and the auxiliary function drive pump 218 will then be driven. If the tractor power take-off is disengaged, the shaft 192 will stop rotating. However, the stored energy in the flywheel 216 will cause the shaft 2 to continue rotating, but because the clutch 212 is a one-way clutch, this rotation will not be transferred to the auxiliary function drive shaft 202.

Figure 5A:
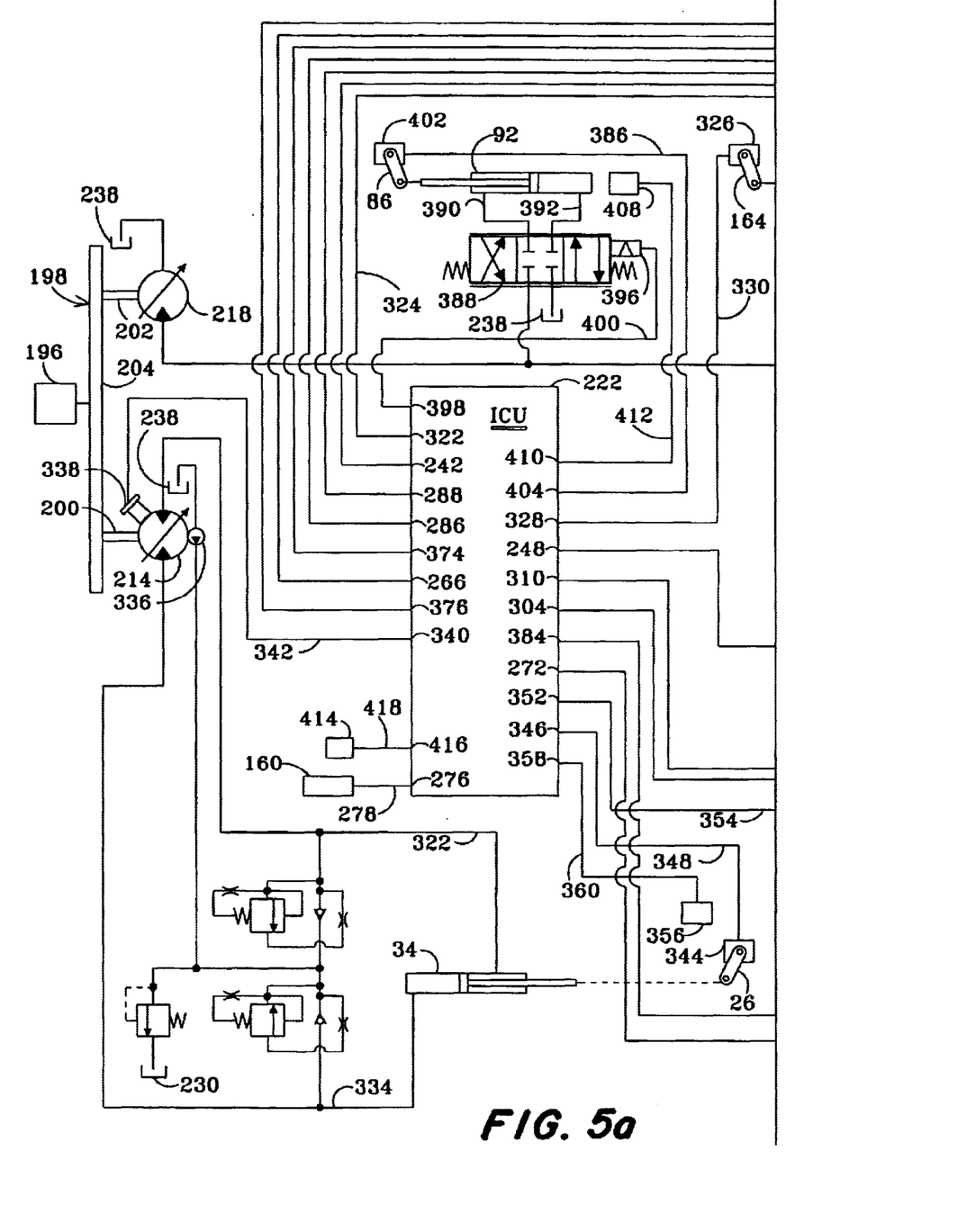
FIGS. 5a and 5b together show a schematic diagram of the electro-hydraulic control system of the present invention.
Figure 5B:
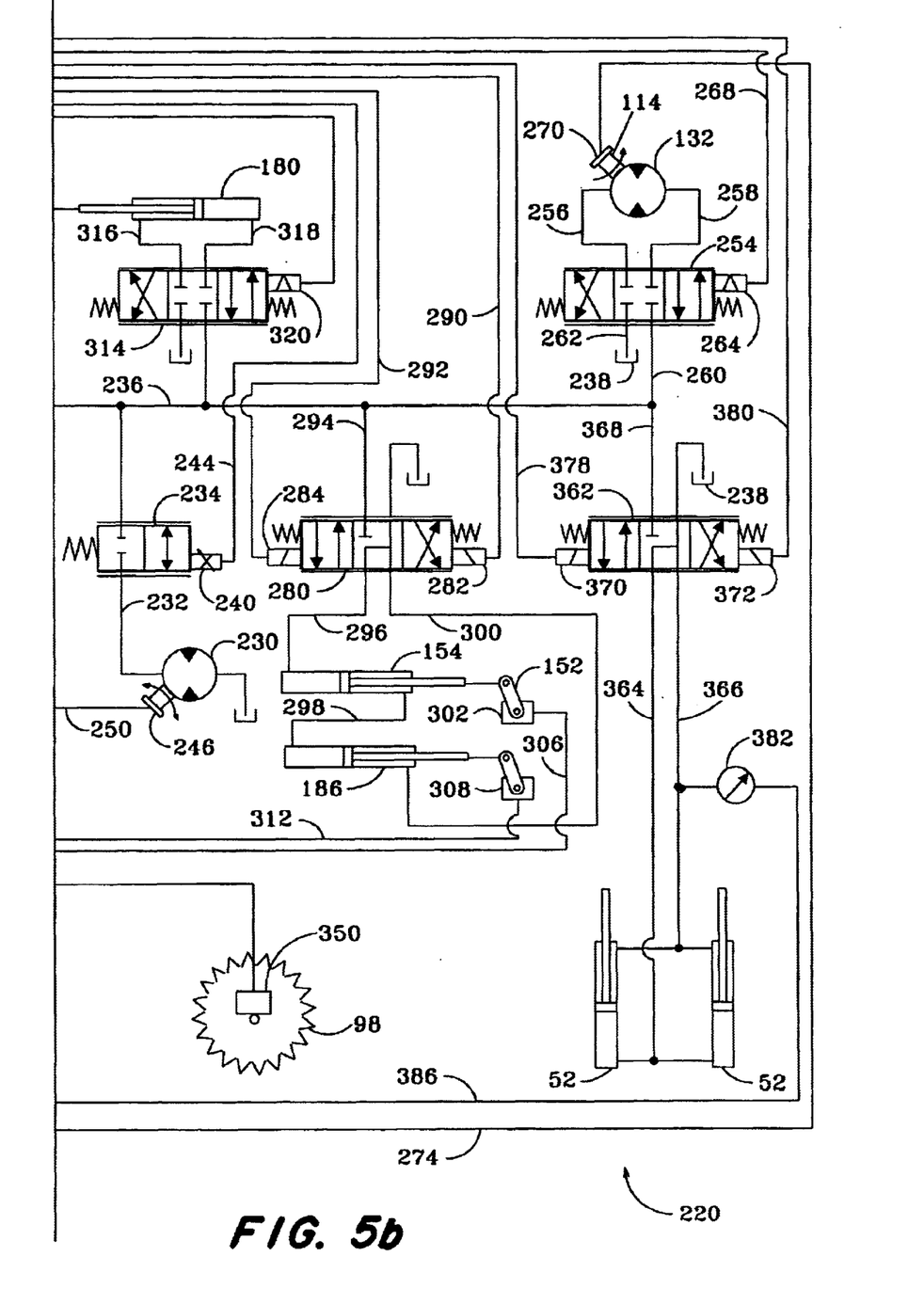

Referring now to FIGS. 5a and 5b, there is shown an electro-hydraulic control system 220 for all of the drive functions of the baler 10, which are all hydraulic. The control system 220 features a computer configured as an implement control unit (ICU) 222, which includes a non-volatile memory for storing various desired signal voltages sent to it by an operator control unit (not shown), which is located in the cab of the tractor 196. The ICU 222 is coupled for retrieving sensed data or feedback from the various functions and compares this data to the stored data, with the information determined being used in the control of the functions, also as described below.

Specifically, considered in the order of the flow of crop through the baler 10, a reversible hydraulic pick-up drive motor 230 is provided which is coupled for driving the tined rotor 207 and the centering stub augers 209 of the pick-up arrangement 106. The drive motor 230 has a first port coupled, as by a conduit 232, for receiving pressurized fluid selectively directed thereto by an electro-hydraulic, two-position, pick-up drive motor control valve 234, having an input port coupled to a pressure supply conduit 236, which is in turn coupled for receiving pressure fluid supplied by the auxiliary function drive pump 218, the latter being coupled to a fluid reservoir 238. A control terminal 240 of the control valve 234 is coupled to a control output port 242 of the ICU 222 by a conductor 244. Upon receiving a control signal, the valve 234 will shift an amount corresponding to the control signal to connect a corresponding metered flow of pressurized fluid so as to cause the motor 230 to rotate at a desired speed and drive the pick-up arrangement 106 so as to deliver crop to the duct 102. A speed feedback signal is provided by a pick-up speed sensor 246, which is in the form of a well known magnetic pick-up associated with the tine rotor of the pick-up 207 so as to determine its rotational speed. This speed signal is coupled to a signal input terminal 248 by a conductor 250 and compared with an operator set target pick-up speed value stored in the ICU 222 and appropriate control signals are sent until the speed is that desired.

The crop delivered by the pick-up arrangement 106 is engaged and transported into the duct arrangement 102 by operation of the packer arrangement 110 which includes the reversible hydraulic drive motor 132 having opposite ports coupled to a spring centered, electro-hydraulic, packer motor control valve 254 by supply/return conduits 256 and 258. The packer motor control valve 254 is a proportional valve which varies flow to and from the motor 252 to achieve a set target packer rotor speed, represented by a value that the operator has stored in the ICU 222. The control valve 254 is connected to the fluid supply conduit 236 by a conduit 260 and to the reservoir 238 by a conduit 262. A valve control terminal 264 of the valve 254 is coupled to an output terminal 266 of the ICU 222 by a conductor 268. Normally, the sense of the control signal received at the control terminal 264 will cause the valve 254 to shift to the left so as to connect the pressure fluid supply conduit 236 to the motor 132 so as to cause it to rotate the packer rotor of shaft 114 clockwise, as viewed in FIG. 3. A packer rotor speed sensor 270, in the form of a magnetic pick-up, is associated with the packer rotor so as to determine its rotational speed. A feedback signal representative of this speed is coupled to a signal input terminal 272 of the ICU 222 by a conductor 274 and is compared with the target packer rotor speed value stored in the ICU 222.

The packer arrangement will continue delivering crop to the duct arrangement 102 until the pre-charge chamber density sensor 160, which includes a pressure switch, is operated so as to send a "full" signal to a control input terminal 276 of the ICU 222 by a conductor 278. The next operation required once the pre-charge chamber 108 is full is for the retainer fork arrangement 138 to be rotated so as to withdraw the tine ends 150 from the chamber. This is accomplished through extension of the tine control cylinder 154 by actuation of a solenoid-operated, spring centered, three-position, tine/fork cylinder control valve 280 having control input terminals 282 and 284, respectively, at its opposite ends coupled to respective control output terminals 286 and 288 of the ICU 222 by respective conductors 290 and 292. The control valve 280 is coupled to the pressure fluid supply conduit 236 by a conduit 294. Concurrent with the extension of the tine control cylinder 154, the fork injector cylinder 186 is caused to extend to move the fork tines 178 into the pre-charge chamber 108, this movement coming about due to the fact that the fork injector cylinder 186 is coupled in series with the retainer tine control cylinder 154. Specifically, a conduit 298 is coupled between the rod end of the cylinder 154 and the head end of the cylinder 186, with the rod end of the latter being coupled to the control valve 280 by a conduit 3. A retaining fork position sensor 302 is associated with the crank arm 152 and sends a signal representative of the retainer fork position to a control input terminal 304 of the ICU 222 by a conductor 306, while a signal representative of the stuffer fork position is generated by a stuffer fork position sensor 308, which is associated with the injector cylinder 186, and sent to a control input terminal 310 of the ICU 222 by a conductor 312. Thus, from these position feedback signals it is known when the retainer tine ends 150 are completely removed from, and when the stuffer fork tines 178 are completely injected into, the pre-charge chamber 108.

With the retainer fork tines 148 withdrawn from, and the stuffer fork tines 178 extended into, the pre-charge chamber 108, the next operation is for the stuffer fork arrangement 112 to be pivoted in order to lift the charge of material into the baling chamber 18. This is done through extension of the stuffer or lift cylinder 180, which is controlled by another proportional valve similar in construction to the packer motor control valve 254. Specifically, provided is a spring centered, stuffer cylinder control valve 314 having a pair of supply/return ports coupled to the rod and head end of the stuffer cylinder 180 by a pair of conduits 316 and 318, the valve 294 being coupled to the pressure supply conduit 236 and the reservoir 238. A control terminal 320 at one end of the valve 314 is coupled for receiving a control signal from an output terminal 322 of the ICU 222 by a conductor 324. Here the signal received would be of a sense for causing the control valve 314 to shift to the left, as viewed in FIG. 5b, so that the stuffer cylinder 180 is extended. The position of the cylinder 180 is monitored by a position sensor 326 associated with either the stuffer cylinder 180 or the frame 164, the sensor 326 generating a signal which is connected to an input terminal 328 of the ICU 222 by a conductor 310. Accordingly, from this position feed back signal, it is known when the stuffer tines 178 reach the extreme upward movement of their travel shown in broken lines in FIG. 3.

Once the flake or slice of crop material has been delivered to the baling chamber 18, the plunger head 20, which has been parked to the rear of the inlet 40, is moved to the rear through operation of the plunger cylinder 34. Fluid pressure for operating the plunger cylinder 34 is delivered by the reversible plunger drive pump 214, which is shown coupled in a closed hydraulic system wherein it is dedicated for driving only the plunger cylinder 34. Thus, the pump 214 has one port coupled to the rod end of the plunger cylinder 34 by a supply/return conduit 332 and the other port coupled to the head end of the plunger cylinder 34 by a supply/return conduit 334. A charge pump 336, that is also driven by the drive shaft 2, is coupled to the reservoir 238 and operates for supplying make-up fluid to the closed system. Appropriate relief valves are provided for protecting the closed loop system. The plunger drive pump 214 includes a displacement control terminal 338 that is coupled to a control output terminal 340 of the ICU 222 by an electrical conductor 342. According to the sense and magnitude of the signal received at the terminal 338, the pump 214 will be driven either in a forward direction, wherein it supplies fluid to the head end of the cylinder 34 for causing its extension, a rearward direction, wherein it supplies fluid to the rod end of the cylinder 34 for causing its contraction, or for placing the pump 214 in a neutral condition wherein it supplies no fluid at all. The position of the plunger cylinder 34 is monitored by a position sensor 344 associated with either the cylinder 34 or the crank arm 26. The sensor 344 creates a signal representative of the position and sends it to a control input terminal 346 of the ICU 222 by a conductor 348. The ICU 222 will act to inhibit the sending of a control signal to actuate the stuffer cylinder 180 if the plunger head 20 is not properly positioned relative to the crop inlet 40. Likewise, the ICU 222 will act to inhibit the sending of a control signal to actuate the knotter cylinder 92, as described below, if the plunger head 20 is not in the correct position for permitting the needles 84 to swing upwardly through the baling chamber 18.

It is noted, that instead of being coupled in a closed system as shown, the pump 214 could also be embodied in an open system wherein it delivers fluid to a proportional valve for controlling the flow of fluid to and from the plunger cylinder 34 so as to control its speed and direction of operation.

Movement of crop by the plunger head 20, as the latter extends to compress a charge of crop material against the forming bale, will cause the latter to move to the rear resulting in rotation of the length sensing wheel 98. A rotation sensor 350, associated with the wheel 98 will send a signal to a control input terminal 352 of the ICU 222 by way of a conductor 334. A value representing a desired bale target length is stored in the non-volatile memory of the ICU 122 and the signal from the length sensing wheel 98 is continuously updated and compared to the stored value.

Density of the compressed crop is monitored by using a force or load sensing arrangement 356 associated with the toggle linkage 24, 26 to sense the amount of force used in compressing the flake or slice against the forming bale, the force sensor 356 generating a signal representative of the force, this signal being sent to a control input terminal 358 of the ICU 222 by a conductor 360. Stored in the non-volatile memory of the ICU 222 is a target force value representing the desired density and the signal received from the force sensor 356 is compared with the stored target value.

Also working to achieve a desired density are the pair of tension cylinders 52. These cylinders 52 are coupled to a solenoid-operated tension control valve 362 by supply/return conduits 364 and 366, which are respectively coupled to the head ends and rod ends of the cylinders 52. The control valve 362 is connected to the pressure supply conduit 236 by a conduit 368, and to the reservoir 238. Extend and retract signal terminals 370 and 372 are respectively provided at the left- and right-hand ends of the valve 362 and are respectively coupled to control output terminals 374 and 376 of the ICU 222 by respective conductors 378 and 380. The pressure developed in the cylinders 52 is monitored by a pressure sensor 382 which creates a representative electrical signal and sends it to a control input terminal 384 of the ICU 222 by a conductor 386.

Assuming that the load sensor 356 sends a signal which is below the stored target value, a signal will be sent to the retract terminal 370 of the tension control valve 362, causing the latter to shift to the left from the centered position shown so as to effect retraction of the cylinders 52 to cause the side panels 50 to pivot inwardly to further restrict the rearward movement of the bale of crop. Of course, a load sensor signal which is above the stored value will result in a signal being sent to the extend terminal 350 of the control valve 342 causing the latter to shift to the right so as to cause the cylinders 52 to extend and pivot the panels 50 outwardly to decrease the resistance to rearward movement of the bale. The amount of increase in the pressure signal received from the pressure sensor 382 may be used to prevent overshoot of the target value.

Once the forming bale has a length, as determined from an accumulation of the pulses produced by the sensor 350, which equals a stored target bale length value, the needle yoke assembly 76 will be caused to deliver twine to the tying arrangement 70 by actuation of the needle and knotter drive cylinder 92. For this purpose, knotter and needle control valve 388, which is also a proportional valve, is respectively coupled to the rod and head ends of the cylinder 92 by supply/return conduits 390 and 392, the control valve 388 also being connected to the pressure fluid supply conduit 236, by a conduit 394, and to the reservoir 238. Control signals, for shifting the valve 388 from a normally centered position, are received by a control terminal 396 that is coupled to a control output terminal 398 of the ICU 222 by a conductor 4. The speed and direction of operation of the cylinder 92 will be in accordance with the magnitude and sense of the signal received. In order for it to be known when the needle yoke assembly 76 is either in its standby position, shown in FIGS. 1 and 2, or at a tying position at its other extreme, a position sensor 402 is associated with the crank arm 86. The sensor 402 creates a position signal that is connected to a control input terminal 404 of the ICU 222 by a conductor 406. A tie monitoring sensor 408 is provided in conjunction with a slack twine arm (not shown), that is biased against a strand of twine extending between the twine source and the tying mechanism, with the sensor 408 acting in response to an abnormal lack of tension in the loop during the tying process to send a tie malfunction signal to a control input terminal 410 of the ICU 222 by a conductor 412.

A baler ground speed sensor 414 is associated with one of the axles of the wheels 14 and acts to create a signal representative of the ground speed of the baler. This signal is sent to an input terminal 416 of the ICU 222 by way of a conductor 418. The crop feeding functions especially may be affected by the ground speed so the operator may input a target ground speed for the baler and cause the towing tractor to be sped up or slowed down to achieve the target baler ground speed. Also, depending on the crop and crop conditions, the operator may place into the memory of the ICU 222 target values of pick-up and/or packer motor speeds based on a target baler ground speed. Then the ICU 222 will operate to maintain these target speeds during operation. Also, the ground speed signal may be used together with pick-up width and density information to determine the throughput of crop.

Having described the preferred embodiment, it will become apparent that various modifications can be made without departing from the scope of the invention as defined in the accompanying claims.

What is claimed is:

1. In a large rectangular baler including a baling chamber having an inlet, a plunger head mounted for reciprocating fore-and-aft within said baling chamber from one side to another of said inlet, a crop delivery duct mounted for directing crop to said inlet of said baling chamber, a pick-up arrangement including a rotatable pick-up device for elevating a windrow of crop material and delivering it rearwardly to said crop delivery duct, a packer arrangement including a rotatable packer device located for receiving crop from said pick-up device and pushing it into a pre-charge chamber of said crop delivery duct which is delimited on its end remote from said packer device by a retractable retaining fork arrangement, the improvement comprising: a variable speed, hydraulic pick-up drive motor being coupled for driving said pick-up device; a variable speed, hydraulic packer drive motor being coupled for driving said packer device; and a hydraulic control valve arrangement being coupled to said pick-up drive motor and said packer drive motor for effecting independent control of the speed of said pick-up and packer drive motors.

2. The baler as defined in claim 1 wherein a control system includes an implement control unit; pick-up and packer speed sensors respectively coupled to said pick-up and packer devices for respectively determining their respective speeds and producing respective pick-up and packer speed feedback signals which are connected to said implement control unit; and said implement control unit having a non-volatile memory into which is programmed target pick-up and packer speed values against which pick-up and packer speed feedback signals are compared for respectively continuously generating pick-up and packer control signals; and said hydraulic control valve arrangement including an electro-hydraulic pick-up motor control valve and an electro-hydraulic packer control valve coupled for respectively receiving said control signals for causing said pick-up and packer motors to be driven at said target speeds.

3. The baler defined in claim 2 wherein said control system further includes a baler ground speed sensor for generating a ground speed signal representative of the ground speed of said baler; said ground speed signal being coupled to said electronic control unit for use in controlling the speed of said one or both of said pick-up and packer motors.

4. The baler defined in claim 1 wherein a plunger head drive arrangement including a reversible, variable displacement hydraulic pump coupled to a hydraulic cylinder is coupled for driving said plunger head; and a pump control arrangement being coupled to said pump for controlling the direction and displacement of fluid therefrom so as to effect extension and retraction of said hydraulic cylinder independently of the control of said pick-up and packer motors.

5. The baler defined in claim 1 wherein said baler further includes a stuffer arrangement mounted for moving crop from said pre-charge chamber to said baling chamber; said stuffer arrangement including: a reciprocable stuffer fork mounted to a pivotal stuffer frame; a hydraulic injector cylinder mounted between the frame and said stuffer fork for moving the latter into and from said pre-charge chamber; and a hydraulic lift cylinder coupled to said stuffer frame for pivoting it once said stuffer fork is moved into said pre-charge chamber for lifting crop found there into the baling chamber; and said hydraulic control valve arrangement being coupled for effecting independent control of said hydraulic injector and lift cylinders.

6. The baler defined in claim 1 wherein said baler further includes a knotter arrangement including a knotter shaft; a needle yoke arrangement including yoke arms mounted for pivoting about an axis extending parallel to said knotter shaft; said knotter shaft being coupled for effecting movement of said needle yoke in response to rotation of said knotter shaft; a hydraulic knotter shaft drive device being coupled for effecting rotation of said knotter shaft; and said control valve arrangement including a knotter control valve coupled to said hydraulic knotter shaft drive device for effecting independent control of said knotter shaft and said needle yoke.

7. The baler defined in claim 6 wherein said knotter control valve is an electrohydraulic valve; said baler further including an electronic control unit having a control output terminal coupled to said knotter control valve; a bale length sensor having an output coupled to a control input terminal of said electronic control unit sending signals representing the length of a bale being formed; said electronic control unit containing a non-volatile memory; a desired bale length value being stored in said memory and being compared with said signals representing the length of a bale being formed; and a control signal being sent to said knotter control valve to initiate a tying cycle when a forming bale reaches said desired bale length.

8. In a large rectangular baler including a wheeled frame supporting a crop pick-up arrangement including a rotatable pick-up device, a duct extending between the pick-up arrangement and an inlet of a baling chamber carried by said frame, a packer arrangement including a rotatable packer unit located for receiving crop from the pick-up device and pushing it into the duct, a stuffer arrangement including a stuffer device mounted for movement into and along said duct for delivering a charge of crop located there to said baling chamber, and a plunger head mounted for movement into the baling chamber for forming bales of compressed crop, the improvement comprising: a separate hydraulic drive component coupled to each of said pick-up device, packer device, stuffer device and plunger head; and a separate hydraulic control component coupled to each separate hydraulic drive component for individually controlling them.

9. The baler defined in claim 8 wherein each hydraulic control component is electrically controlled; and an electronic control unit being coupled to control terminals of each hydraulic control component; said electronic control unit having a non-volatile memory storing target pick-up and packer speed values; and said pick-up and packer devices each including a speed sensor associated therewith and coupled to said electronic control unit for comparison with said target pick-up and packer speed values; and said electronic control unit operating to send control signals to the separate hydraulic control components associated with said pick-up and packer drive devices for causing them to be driven at said target values.

* * * * *